United States Patent [19]

Muto

[11] Patent Number: 5,079,512
[45] Date of Patent: Jan. 7, 1992

[54] QUADRATURE DEMODULATION OF A DATA SEQUENCE FOLLOWING A PARTICULAR SIGNAL SEQUENCE WITH A LOCAL REFERENCE CARRIER SIGNAL HAVING A FREQUENCY DIFFERENT FROM A RECEIVED CARRIER SIGNAL

[75] Inventor: Hiroyasu Muto, Tokyo, Japan
[73] Assignee: NEC Corporation, Tokyo, Japan
[21] Appl. No.: 553,288
[22] Filed: Jul. 17, 1990
[30] Foreign Application Priority Data
Jul. 17, 1989 [JP] Japan ................. 1-185426
[51] Int. Cl.$^5$ ................. H04L 1/00
[52] U.S. Cl. ................. 329/304; 329/308
[58] Field of Search ............ 329/304, 306, 307, 308
[56] References Cited
U.S. PATENT DOCUMENTS
4,546,322 10/1985 Crutcher ................. 329/308

Primary Examiner—Robert J. Pascal
Attorney, Agent, or Firm—Sughrue, Mion, Zinn, Macpeak & Seas

[57] ABSTRACT

An angular modulated signal is quadrature demodulated (37) into first and second signal vectors by a local carrier signal (36) having a frequency difference from a received carrier signal which is angular modulated by a modulating signal comprising symbols representative of binary one and zero at a symbol interval. In the modulating signal, a particular symbol sequence comprises the symbols in a predetermined manner and results in the first signal vector. A data symbol sequence comprises the symbols to represent data and results in the second signal vector. The first signal vector has inphase and quadrature phase amplitudes which are converted (41) to phase values substantially at the symbol interval. An individual error is provided by comparing (44) a phase variation between two phase values (42–43) with a reference variation (45) determined by the predetermined manner. Such individual errors are averaged (46) into a phase error (47) which is used in correcting (39) the second signal vector. It is possible to compute the phase error by calculating the phase variation using a reference variation determined by the predetermined manner and the received carrier signal.

6 Claims, 6 Drawing Sheets

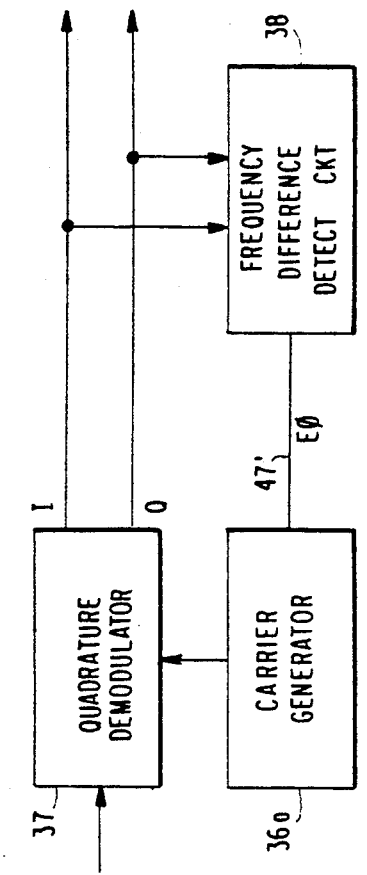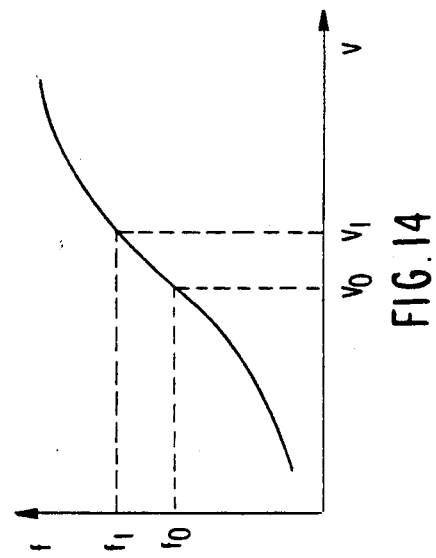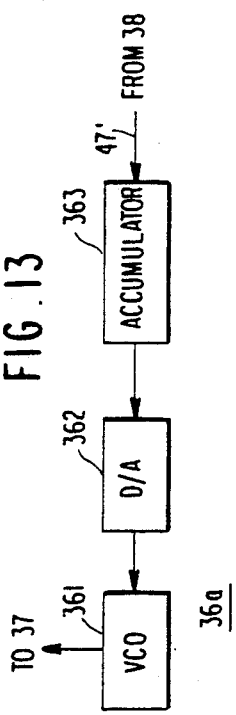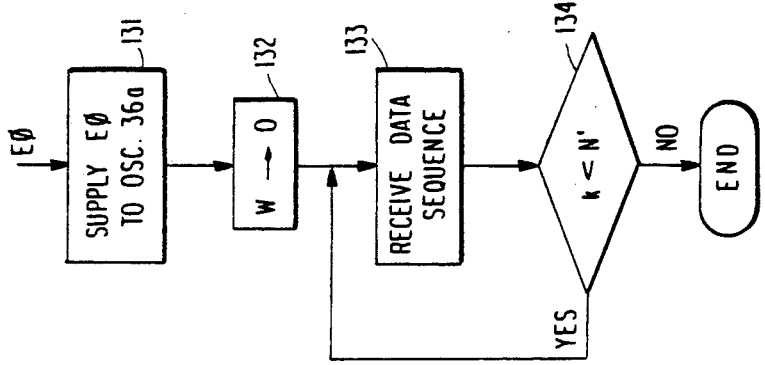

QUADRATURE DEMODULATION OF A DATA SEQUENCE FOLLOWING A PARTICULAR SIGNAL SEQUENCE WITH A LOCAL REFERENCE CARRIER SIGNAL HAVING A FREQUENCY DIFFERENT FROM A RECEIVED CARRIER SIGNAL

BACKGROUND OF THE INVENTION

This invention relates to quadrature demodulation of an angular modulated signal which is derived by angular modulation of a carrier signal by a modulating signal comprising symbols representative of binary one and zero and is received by a receiver as a received signal. The modulating signal comprises a particular symbol sequence or pattern comprising the symbols in a predetermined manner and a data symbol sequence comprising the symbols to represent data or information which is to be transmitted to the receiver. The particular symbol sequence may be, for example, a preamble used in time division multiple access communication.

More particularly describing the predetermined manner, the symbols are included in the particular symbol sequence at a predetermined symbol interval. The particular symbol sequence consists of a predetermined number of symbols representative of all the binary ones or all the binary zeros. Alternatively, the particular symbol sequence may include a partial sequence in which the symbols alternatingly represent the binary one and zero. Such a predetermined manner is preliminarily known at the receiver side. Incidentally, the symbols are included in the data symbol sequence also at the predetermined symbol interval.

When the angular modulated or the received signal is quadrature demodulated, a demodulated signal is produced to comprise inphase and quadrature phase components. In this connection, it may be mentioned that the received signal comprises a particular signal sequence and a data signal sequence which are produced by angular modulating a carrier signal with the particular and the data symbol sequences. The demodulated signal therefore comprises a reproduced symbol sequence and a reproduced data sequence. The data signal sequence may briefly be called a data sequence with omission of the word "signal".

In order so to quadrature demodulate the received signal, a reference carrier signal is used in the receiver. The reference carrier signal is either recovered from the received signal or locally generated by a carrier oscillator. In either event, the reference carrier signal must have a local carrier frequency which is equal to a received carrier frequency of the received carrier signal. Various methods are known to keep the local carrier frequency equal to the received carrier frequency. In whichever of the methods, the local carrier recovery (oscillation) circuit must have a complicated structure. When used, the local carrier recovery circuit must be operable with a high precision and stability. The local carrier recovery circuit therefore becomes bulky and expensive. Otherwise, the particular signal sequence is not quadrature demodulated into the reproduced symbol sequence which is a correct reproduction of the particular symbol sequence. The data symbol sequence is not adequately reproduced as the reproduced data sequence from the data signal sequence.

A prior patent application Ser. No. 541,690, was filed June 21, 1990, in the United States by Hiroyasu MUTO, the present applicant, based on two patent applications originally filed in Japan under patent application Ser. Nos. 156,856 and 156,857 of 1989. In the manner described in the prior patent application, the inphase and the quadrature phase components are cooperatively representative of a signal vector on a phase plane which is defined by inphase or real and quadrature phase or imaginary axes orthogonally intersecting each other at an origin. The signal vector has a first phase variable on the phase plane around the origin in accordance with the particular symbol sequence and a second phase which is variable according to the data symbol sequence. A sampling clock signal is generated in the receiver to define a sampling interval which is substantially equal to the symbol interval.

In the manner known in the art and described in the prior patent application, the sampling clock signal is used in primarily sampling the inphase and the quadrature phase components of the reproduced symbol sequence into phase samples of the first signal vector. Two consecutive ones of the phase samples have a phase difference which is predetermined in compliance with the particular symbol sequence. In the prior patent application, such phase differences are calculated substantially during the predetermined number of symbol intervals for use in detecting the particular signal sequence in the received signal. Incidentally, the fact is discussed in the prior patent application that the phase samples are subjected to rotation around the origin when the sampling interval is not exactly equal to the symbol interval.

In the manner which will later be described in detail, each of the first and the second phases is subjected to a similar rotation when the local carrier frequency is different from the received carrier frequency. In view of the foregoing, it is possible to briefly say in connection with the quadrature demodulation that the angular modulated signal is demodulated by the local carrier signal into a first signal vector having the first phase and into a second signal vector having the second phase. Incidentally, the particular symbol sequence is said herein to include the partial sequence when a plurality of particular symbol sequences are used in the modulating signal in the manner described in the prior patent application.

SUMMARY OF THE INVENTION

It is therefore an object of the present invention to provide a method of quadrature demodulating an angular modulated signal derived by angular modulation of a carrier signal of a carrier frequency by a data symbol sequence comprising binary one and zero symbols after a particular symbol sequence comprising like symbols in a predetermined manner, in which method it is unnecessary to use a local carrier signal having a carrier frequency exactly equal to the received carrier frequency.

It is another object of this invention to provide a device for carrying out the method of the type described.

It is still another object of this invention to provide a device of the type described, which is compact and inexpensive.

Other objects of this invention will become clear as the description proceeds.

On describing the gist of this invention, it is possible to understand that quadrature demodulation is for demodulating an angular modulated signal derived by angular modulation of a carrier signal of a carrier frequency by a modulating signal which comprises symbols representative of binary one and zero, a particular symbol sequence comprising the symbols in a predetermined manner, and a data symbol sequence comprising the symbols to represent data.

According to an aspect of this invention, there is provided a method of carrying out the above-understood quadrature demodulation and comprises the steps of: (1) generating a local carrier signal of a local carrier frequency having a frequency difference relative to the received carrier frequency; (2) quadrature demodulating the angular modulated signal by the local carrier signal into a first signal vector having a first phase variable in compliance with the predetermined manner and the frequency difference and into a second signal vector having a second phase variable in compliance with the data and the frequency difference; (3) determining, by comparison of a phase variation in the first phase with a reference variation determined by the predetermined manner, a phase error between the first phase and a first correct phase which the first signal vector has when the frequency difference is equal to zero; and (4) correcting the second phase by the phase error into a second correct phase which the second signal vector has when the frequency difference is equal to zero.

According to another aspect of this invention, there is provided a device for carrying out the above-understood quadrature demodulation and comprises: (1) a local carrier generator for generating a local carrier signal of a local carrier frequency having a frequency difference relative to the received carrier frequency; (2) a quadrature demodulator for demodulating the angular modulated signal by the local carrier signal into a first signal vector having a first phase variable in compliance with the predetermined manner and the frequency difference and into a second signal vector having a second phase variable in compliance with the data and the frequency difference to produce first and second vector signals representative of the first and the second signal vectors; (3) a frequency difference determining circuit supplied with the first vector signal for determining a phase error between the first phase and a first correct phase variable in compliance with the predetermined manner and the received carrier frequency by comparison of a phase variation in the first phase with a reference variation determined by the predetermined manner to produce a phase error signal representative of the phase error; and (4) a phase correcting circuit supplied with the second vector signal and the phase error signal for correcting the second phase by the phase error into a second correct phase variable in compliance with the data and the carrier frequency to produce a corrected vector signal having the second correct phase.

According to a modification of the first-mentioned aspect of this invention, there is provided a method of carrying out the above-understood quadrature demodulation and comprises the steps of; (1) generating a local carrier signal of a local carrier frequency having a frequency difference relative to the received carrier frequency; (2) quadrature demodulating the angular modulated signal by the local carrier signal into a first signal vector having a first phase variable in compliance with the predetermined manner and the frequency difference and into a second signal vector having a second phase variable in compliance with the data and the frequency difference; (3) computing a phase error between a phase variation in the first phase and a reference variation determined by the predetermined manner and the received carrier frequency; and (4) correcting the second phase by the phase error into a second correct phase which the second signal vector has when the frequency difference is equal to zero.

BRIEF DESCRIPTION OF THE DRAWING

FIG. 11 shows a flow chart for use in describing a quadrature demodulating method in accordance with a fifth embodiment of the present invention;

FIG. 12 is a block diagram showing a quadrature demodulating devide according to a sixth embodiment of the present invention;

FIG. 13 is a block diagram showing a local carrier oscillator used in the FIG. 12 device; and FIG. 14 is a graph showing a control voltage vs. oscillation frequency characteristic of VCO employed in the local carrier oscillator in FIG. 13.

DESCRIPTION OF THE PREFERRED EMBODIMENTS

Figure 1:
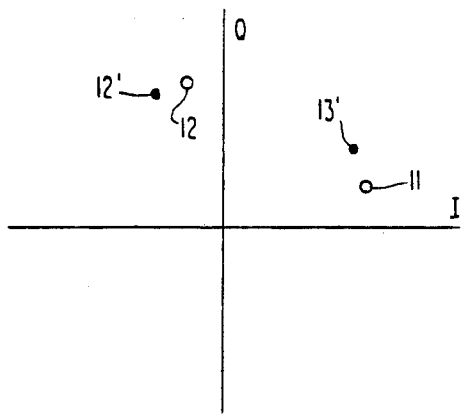
FIG. 1 shows a phase plane for use in describing rotation of a signal vector.

Referring to FIG. 1, a phase plane is defined by an orthogonal coordinate system of inphase (I) or real and quadrature phase (Q) or imaginary axes which orthogonally intersect each other at an origin. Attention will be directed to an angular modulated signal which is received by a receiver as a received signal and into which a carrier signal of a carrier frequency is subjected to minimum phase shift keying (MSK) modulation by a modulating signal comprising symbols representative of binary one and zero at a predetermined symbol interval T.

In the manner described in the prior patent application referred to hereinabove, the angular modulated or the received signal is quadrature demodulated into a demodulated signal comprising inphase and quadrature phase components cooperatively representative of a signal vector which is not herein depicted but rotates around the origin with lapse of time t in the manner exemplified below. The signal vector has an absolute value having a fixed end at the origin and a phase measured counterclockwise from a positive part of the inphase axis.

It will be assumed that the signal vector has a movable end at a first point 11 at a certain time instant which will be called a first time instant. In other words, the signal vector has a first phase represented by the first point 11 at the first time instant. At a second time instant which is one symbol interval T later than the first time instant, the signal vector has the movable end at a second point 12 to have a second phase which is 90° greater than the first phase if one of the symbols represents the binary one during the one symbol interval under consideration. At a third time instant one symbol interval T later than the second time instant, the signal vector has the movable end again at the first point 11 to have a third phase which is equal to the first phase and is 90° less than the second phase if another of the symbols represents the binary zero between the second and the third time instants. It should be noted that the terms the "first phase" and the "second phase" are used for the time being differently from those used on describing the gist of this invention heretobefore.

At any rate, the movable end moves along a circular locus having a center at the origin and a radium which is equal to the absolute value. The signal vector has a phase variable 90° forwardly or counterclockwise and 90° backwardly or clockwise when each symbol represents the binary one and zero, respectively. It may be mentioned here that the modulating signal comprises a particular symbol sequence or pattern comprising the symbols in a predetermined manner and a data symbol sequence comprising the symbols to represent data or information which is to be transmitted to the receiver. The angular modulated or the received signal comprises a particular signal sequence and a data signal sequence which are produced by the minimum phase shift keying modulation of the carrier signal by the particular and the data symbol sequences. The particular and the data signal sequences are demodulated into reproductions of the particular and the data symbol sequences by detecting a phase variation in the phase of the signal vector in each symbol interval T.

The above holds only when the angular modulated signal is quadrature demodulated by using a local (reference) carrier signal having a local carrier frequency which is equal to the received carrier frequency. If the local carrier signal has an actual carrier frequency which has a frequency difference of a finite value relative to the received carrier frequency, such first and second points 11 and 12 move forwardly and backwardly along the circular locus when the finite value is positive and negative.

Angular frequencies will now be used as such frequencies. The received carrier signal has a carrier angular frequency W, denoted by a double-u rather than the Greek omega minuscule. When subjected to the minimum phase shift keying modulation, the modulated or the received signal of a unit amplitude is represented by:

$$\cos \phi(t) \cdot \cos Wt + \sin \phi(t) \cdot \sin Wt,$$

where $\cos\phi(t)$ and $\sin\phi(t)$ represent inphase and quadrature phase components of the modulated signal, respectively.

It will be presumed that the local carrier signal has a local-carrier angular frequency $(W - w)$ and a phase offset $\theta$ relative to the received carrier signal, where $w$ represents an angular frequency difference between the received carrier and the local-carrier angular frequencies. Under the circumstances, the demodulated signal is given by:

$$\cos \phi(t) \cdot \cos (wt+\theta) + \sin \phi(t) \cdot \sin (wt+\theta) - \cos \phi(t) \cdot \sin (wt+\theta) + \sin \phi(t) \cdot \cos (wt+\theta).$$

It is now understood that the signal vector rotates forwardly around the origin at an angular speed of rotation of w radian per unit time in addition to a rotation of 90° forwardly or backwardly per symbol interval T and has a rotated phase different from the phase which is described above and will now be called a reference phase for discrimination from the rotated phase.

In FIG. 1, let the signal vector have the first reference phase illustrated by the first point 11 at the first time instant as before. In other words, let the signal vector have a first rotated phase which is identical with the first reference phase. At the second time instant, the second reference phase is given a forward rotation of wT radian to become a second rotated phase which is 90° plus wT radian greater than the first reference phase and is represented by a different second point 12'. At the third time instant, the signal vector has a third rotated phase into which the second rotated phase is given a backward rotation of 90° minus wT radian. The third rotated phase is therefore 2 wT radian greater than the first reference phase and is depicted at a different third point 13'.

In this manner, the signal vector has a phase variable either by wT radian plus 90° or wT radian minus 90° per symbol interval T. When the angular frequency difference w is considerably large, it becomes impossible to correctly reproduce the particular and the data symbol sequences from the received signal.

Figure 2:
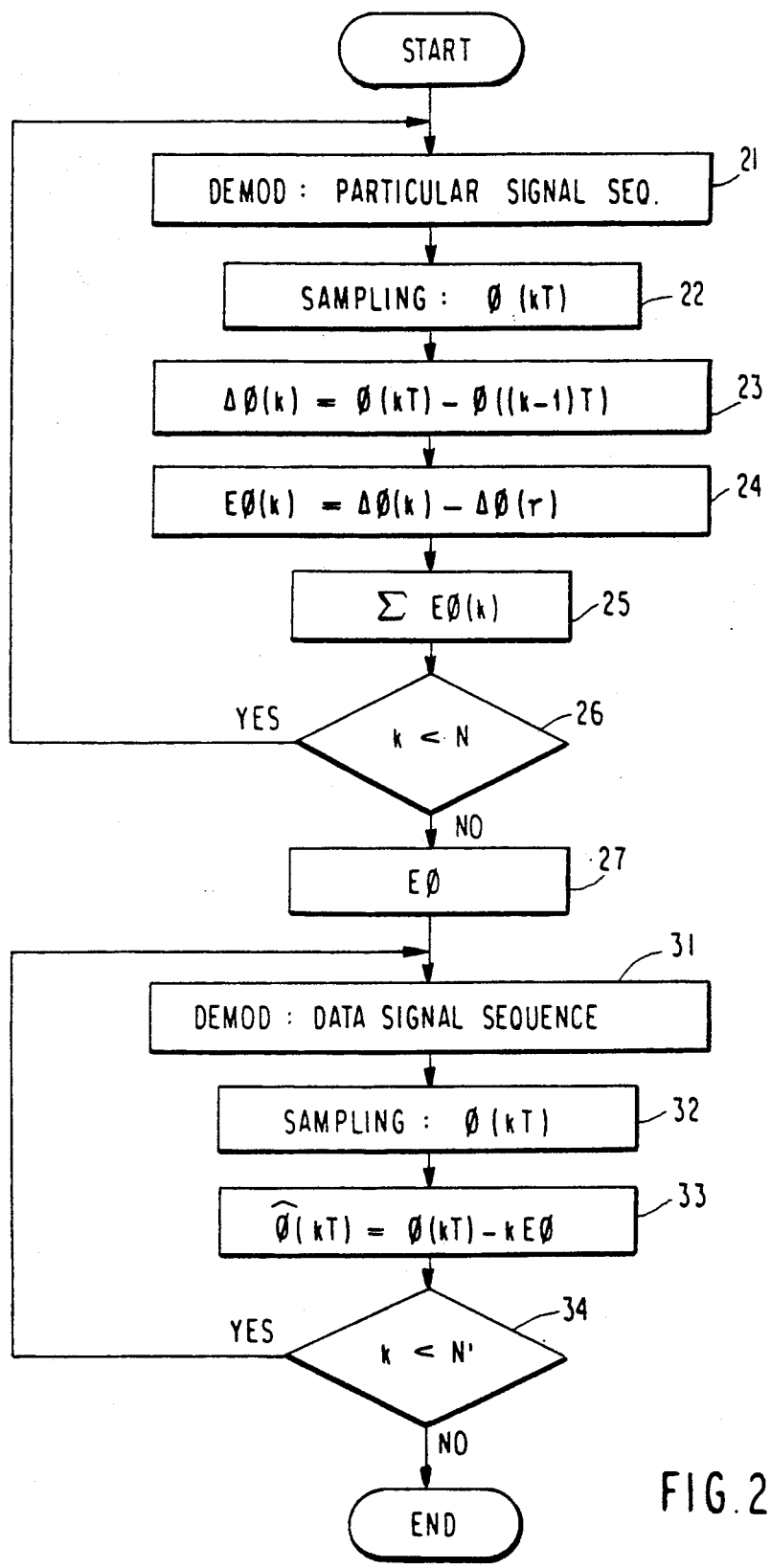
FIG. 2 shows a flow chart for use in describing a quadrature demodulating method according to a first embodiment of the instant invention.

Referring now to FIG. 2, the description will proceed to a quadrature demodulating method according to a first embodiment or aspect of this invention. The method is applied in a receiver to the quadrature demodulation described above. The local carrier signal is either regenerated from the received signal or locally generated with an ordinary precision. The local carrier signal need not be phase synchronized with the received carrier signal by the use of a phase synchronizing circuit. In the manner described in the prior patent application, a sampling clock signal is generated in the receiver to define a sampling interval which is substantially equal to the symbol interval T. The particular symbol sequence or pattern has a pattern length N which is equal to the predetermined number of symbol intervals. The data symbol sequence has a data length N'. It will be surmised that the data length N' is preliminarily conveyed to the receiver side and thst the local carrier frequency or the local-carrier angular frequency is stable at least throughout the pattern length N plus the data length N'.

The method starts when the receiver is supplied with the angular modulated or the received signal. At a first primary step 21 at which frequency difference determination starts, the particular signal sequence is quadrature demodulated by the local carrier signal into a first vector signal representative of a first signal vector having a first phase variable in compliance with the predetermined manner and the frequency difference. The first primary step 21 is therefore a quadrature demodulating step of quadrature demodulating the angular modulated or the received signal by the local carrier signal into the first vector signal and into a second vector signal representative of a second signal vector having a second phase variable in compliance with the data and the frequency difference.

At a second primary step 22, the sampling clock signal is used to derive phase value $\phi(kT)$ from the first vector signal, where k represents a time instant number or a symbol count of the symbols in the particular symbol sequence and increases one by one at the symbol interval T. The phase values are variable from one to another in compliance with the predetermined manner and the frequency difference. In any event, the second primary step 22 is a converting step of converting the first phase to the phase values substantially at the symbol interval T.

At a third primary step 23, a phase difference $\Delta\phi(k)$ is calculated between two consecutive ones of the phase values in the manner illustrated by a difference between each phase value $\phi(kT)$ and another phase value $\phi((k-1)T)$ that is derived one symbol interval T before. The third primary step 23 is therefore a phase difference calculating step of calculating the phase difference as a phase variation in the first phase in each symbol interval T.

At a fourth primary step 24, the phase difference $\Delta\phi(k)$ is compared with a reference variation $\Delta\phi(r)$ which is determined by the predetermined manner and is equal to plug 90°, minus 90°, and 0° when the particular symbol sequence consists of the symbols which consecutively represent the binary one alone and the binary zero alone and alternatingly represent the binary one and zero, respectively. The reference variation should be changed in connection with partial sequences when the particular symbol sequence comprises such partial sequences. In this manner, it is possible to determine an individual phase error $E\phi(k)$ which is equal to the forward rotation of wT radian described in conjunction with FIG. 1. The fourth primary step 24 is consequently an error calculating step of calculating the individual error to provide a plurality of individual errors substantially during the predetermined number of symbol intervals NT. Being determined by the predetermined manner, the reference variation $\Delta\phi(r)$ is preliminarily known at the receiver side.

At a fifth primary step 25, the individual error $E\phi(k)$ is summed up into a summation. At a sixth primary step 26, the time instant number k is checked against the predetermined number N. If the time instant number k is less than the predetermined number N, one is added to the time instant number k. The sixth primary step 26 returns to the first primary step 21. It should therefore be understood that the quadrature demodulating, the converting, and the error calculating steps include the sixth primary step 26.

When the time instant number k increase substantially up to the predetermined number N, the sixth primary step 26 proceeds to a seventh primary step 27 at which the summation is divided by the predetermined number N. The seventh primary step 27 is accordingly an averaging step of averaging the individual errors into a phase error $E\phi$ between the first phase and a first correct phase which the first signal vector should have when the frequency difference were equal to zero. The converting, the phase difference calculating, the error calculating, and the averaging steps may collectively be called an error determining step of determining the phase error by comparison of the phase variation in the first phase with the reference variation.

The seventh primary step 27 procees to a first secondary step 31 at which the data signal sequence is quadrature demodulated by the local carrier signal into the second vector signal. At a second secondary step 32, the second signal vector is sampled by the sampling clock signal into phase values $\phi(kT)$. At a third secondary step 33, the second phase of each phase value is corrected by the accumulated phase error $kE\phi$, in which the phase error $E\phi$ is calculated in the seventh primary step 27, into a second correct phase $\overline{\phi}(kT)$ which each phase value of the second phase would have when the frequency difference were equal to zero. At a fourth secondary step 34, the time instant number k is checked against the data length N' or, more precisely, against a symbol count in the data length N'. If the time instant number k is less than the data length N', the fourth secondary step 34 returns to the first secondary step 31 with one added to the time instant number k.

It is now understood that the quadrature demodulating step is carried out at the first and the sixth primary steps 21 and 26 and at the first and the fourth secondary steps 31 and 34. The converting step is carried out at the second primary and secondary steps 22 and 32. A combination of the third and the fourth secondary steps 33 and 34 is a phase correcting step of correcting the second phase into the second correct phase. When the time instant number k increases substantially up to the data length N', the quadrature demodulating method comes to an end.

Figure 3:
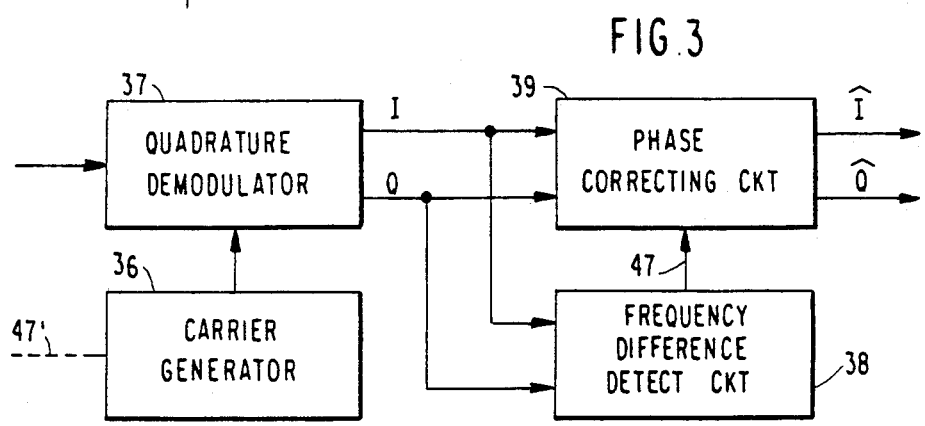
FIG. 3 is a block diagram of a quadrature demodulating device according to a second embodiment of this invention.

Referring now to FIG. 3, the description will proceed to a quadrature demodulating device according to a second embodiment or aspect of this invention. The device is for carrying out the quadrature demodulating method illustrated with reference to FIG. 2.

The demodulator comprises a local carrier generator 36 for either regenerating from the received signal or locally generating a local carrier signal of a local carrier frequency which has a frequency difference relative to the received carrier frequency. The received signal is supplied to a quadrature demodulator 37 for quadrature demodulating the received signal into inphase and quadrature phase component signals I and Q representative of inphase and quadrature phase amplitude values which are variable with time t and are cooperatively representative of the first and the second signal vectors described before.

A combination of the inphase and the quadrature phase component signals is therefore the first and the second vector signals when derived from the particular and the data signal sequences. Derived from the particular signal sequence, the inphase and the quadrature phase component signals I and Q are delivered to a frequency difference determining or detecting circuit 38. The circuit 38, which will presently be described, detects a phase error representing a frequency difference between the received and local carrier signals. The inphase and the quadrature phase component signals I and Q are also supplied to a phase correcting circuit 39 operable in the manner which will later be described.

Figure 4:
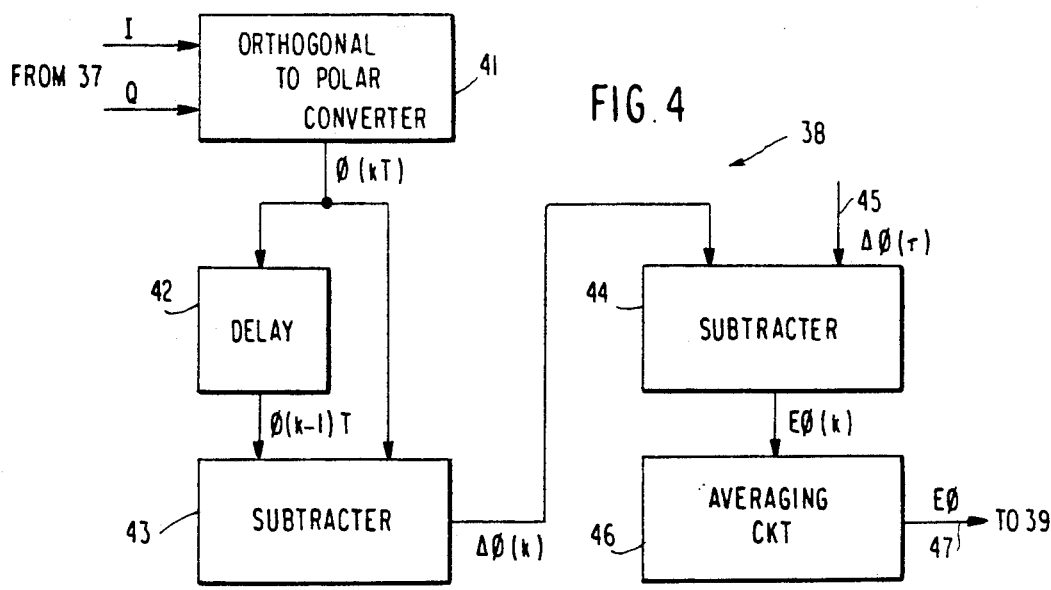
FIG. 4 is a block diagram of a phase error determining circuit for use in the device depicted in FIG. 3.

Turning to FIG. 4, the frequency difference determining circuit 38 comprises an orthogonal to polar coordinate converter 41 for producing from the inphase and the quadrature phase component signals I and Q phase values $\phi(kT)$ which the first signal vector has substantially at the symbol interval T determined by the predetermined manner and preliminarily known at the receiver side. The orthogonal to polar coordinate converter 41 thereby produces a phase value signal representative of the phase values. It is readily possible to implement the orthogonal to polar coordinate converter 41 by a read-only memory (ROM).

The phase value signal is delivered to a delay circuit 42 and a phase value substracter 43. The delay circuit 42 gives a delay of one symbol interval T to each phase value to produce a delayed signal representative of delayed values, each given the delay. Supplied with the phase value signal and the delayed signal, the substracter 43 calculates a phase difference $\phi(k)$ between two consecutive ones of the phase values $\phi(kT)$ and $\phi((k-1)T)$. The phase difference $\phi(k)$ represents a phase variation to which the first signal vector is subjected in each symbol interval T. The subtracter 43 thereby produces a difference signal representative of such phase differences. A combination of the delay circuit 42 and the phase value substracter 43 therefore serves as a phase difference calculating circuit supplied with the phase value signal for calculating each phase difference as the phase variation to produce the difference signal.

The difference signal is delivered to a difference subtracter 44 which may be referred to simply as a subtracter depending on the circumstances and is supplied through a signal supply lead 45 with a reference signal representative of plus 90°, minus 90°, or 0° at a time as a reference variation $\Delta\phi(r)$ in the phase values $\phi(kT)$ of the first signal vector. The substracter 44 thereby calculates an individual error $E\phi)k)$ between the phase difference $\Delta\phi(k)$ and the reference variation to produce an error signal representative of such individual errors. Each invididual error is equal to a difference between the first phase of the first signal vector and a first correct phase which the first signal vector would have when the frequency difference were equal to zero. It should be noted in this connection that the reference variation is determined by the predetermined manner and is preliminarily known at the receiver side and that the signal supply lead 45 is in practice a reference signal generating arrangement for generating the reference signal in the manner described in the prior patent application.

The error signal is delivered to an averaging circuit 46 in which the individual errors are summed up into a summation until the time instant number k of the individual errors reaches a total number K which is substantially equal to the predetermined number N and is determined by the attendant in accordance with the predetermined number in the manner described in the prior patent application. The averaging circuit 46 calculates a phase error $E\phi$ by dividing the summation by the total count K and supplies a phase error signal lead 47 with a phase error signal representative of the phase error $E\phi$.

Reviewing FIGS. 3 and 4, it is understood that the frequency difference detecting circuit 38 is for comparing the phase variation in the first phase with the reference variation (45). The frequency difference determining circuit 38 thereby determines or calculates the phase error $E\phi$ representative of a frequency difference between the received carrier and local carrier signals, producing the phase error signal.

Figure 5:
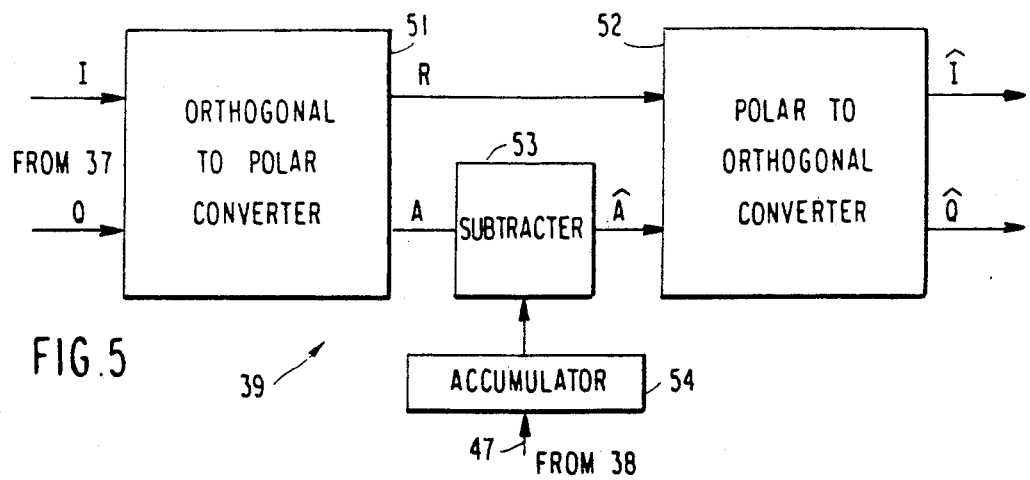
FIG. 5 is a block diagram of a phase error correcting circuit for use in the device illustrated in FIG. 3.

Referring to FIG. 5, the phase correcting circuit 39 comprises an orthogonal to polar coordinate converter 51 supplied with the inphase and the quadrature phase component signals I and Q produced by the quadrature demodulator 37 in response to the received signal. The orthogonal to polar coordinate converter 51 produces a radius vector signal R and an argument signal A. The radius vector signal R represents the afore-mentioned absolute value of the signal vector. The argument signal A represents an argument of the radius vector, namely, the phase value $\phi(kT)$ of the signal vector.

The radius vector signal R is delivered directly to a polar to orthogonal coordinate converter 52. The argument signal A is supplied to the polar to orthogonal coordinate converter 52 through a phase correction subtracter 53 supplied with an accumulated phase error signal from an accumulator 54. The accumulator accumulates the phase error $E\phi$ supplied through the phase error signal lead 47 from frequency difference determining circuit 38 to produce the accumulated phase error $kE\phi$. The subtracter 53 subtracts the accumulated phase error $kE\phi$ from the phase value $\phi(kT)$ represented by the arugment signal A to provide a correct phase value $\hat{\phi}(kT)$ to produce a correct phase signal $\hat{A}$ representative of the correct phase value.

Supplied with the radius vector signal R and the correct phase signal $\hat{A}$, the polar to orthogonal coordinate converter 52 converts a combination of the absolute value of the signal vector and the correct phase value of the signal vector from polar coordinates back to the orthogonal coordinate system representative of the phase plane. The polar to orthogonal coordinate converter 52 thereby produces correct inphase and quadrature phase component signals $\hat{I}$ and $\hat{Q}$ representative of a corrected vector signal, namely, the reproduced data sequence. It is readily possible to implement each of the coordinate converters 51 and 52 by a read-only memory (ROM).

Figure 6:
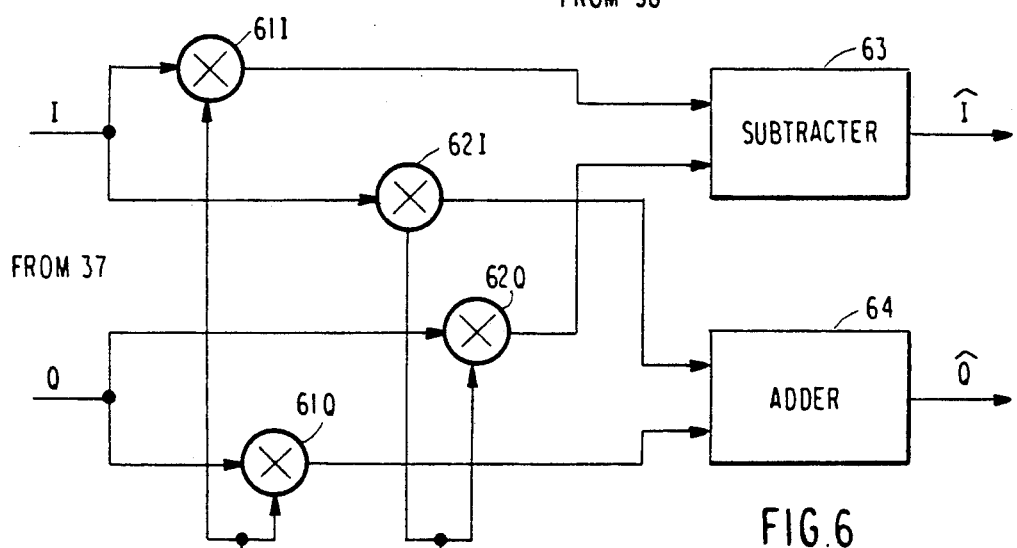
FIG. 6 is a block diagram of another phase error correcting circuit for use in the device depicted in FIG. 3.

Turning to FIG. 6, the phase correcting circuit 39 may alternatively comprise cosine and sine read-only memories (ROM) 56 and 57, both supplied with the accumulated phase error signal from accumulator 54 which in turn is supplied with the phase error signal from the frequency difference determining circuit 38 through the phase error signal lead 47. The cosine read-only memory 56 produces a cosine signal representative of $\cos(kE\phi)$. The sine read-only memory 57 produces a sine signal representative of $\sin(kE\phi)$.

It may be mentioned here that a correct signal vector has a correct phase $\hat{\phi}(kT)$ which is equal to the phase $\phi(kT)$ represented by the inphase and the quadrature phase component signals I and Q minus the phase error $kE\phi$. A correct inphase component of the correct signal vector is therefore equal to $I\cos(kE\phi)$ minus $Q\sin(-kE\phi)$, which may be called first inphase and quadrature phase parts. A correct quadrature phase component of the correct signal vector is equal to $Q\cos(kE\phi)$ plus $I\sin(kE\phi)$, which may be called second quadrature phase and inphase parts.

In view of the above, the cosine signal is delivered to first inphase and quadrature phase multipliers 61I and 61Q which are supplied with the inphase and the quadrature phase component signals I and Q produced by the quadrature demodulator 37 in response to the received signal. The first inphase multiplier 61I produces a first inpyase signal representative of the first inphase part. The first quadrature phase multiplier 61Q produces a first quadrature phase signal representative of the second quadrature phase part.

The sine signal is delivered to second inphase and quadrature phase multipliers 62I and 62Q which are supplied with the inphase and the quadrature phase component signals I and Q delivered to the first inphase and quadrature phase multipliers 61I and 61Q. The second inphase multiplier 62I produces a second inphase signal representative of the second inphase part.

The second quadrature phase multiplier 62Q produces a second quadrature phase signal representative of the first quadrature phase part.

A subtracter 63 is supplied with the first inphase signal and the second quadrature phase signal to produce a correct inphase component signal Î representative of the correct inphase component. An adder 64 is supplied with the first quadrature phase signal and the second inphase signal and produces a correct quadrature phase component signal Q̂ representative of the correct quadrature phase component.

Figure 7:
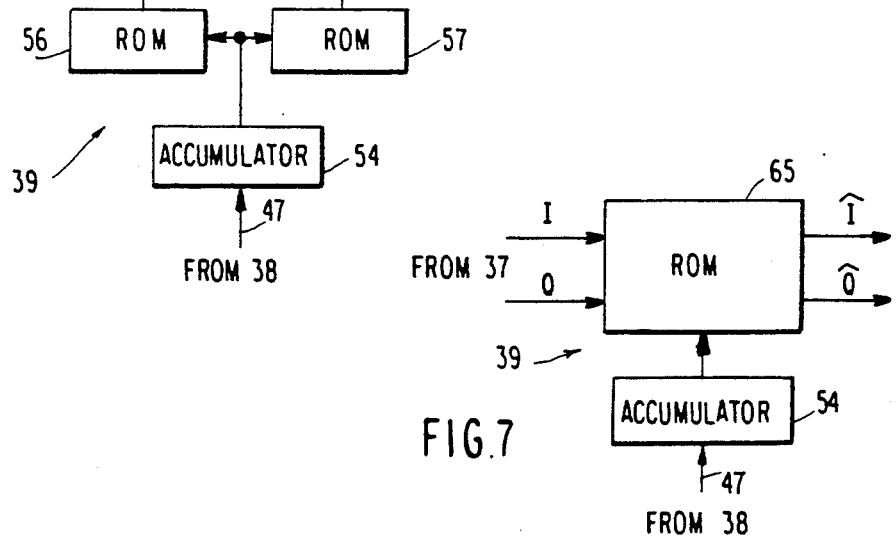
FIG. 7 is a block diagram of still another phase error correcting circuit for use in the device shown in FIG. 3.

Further turning to FIG. 7, the phase correcting circuit 39 is implemented by a read-only memory (ROM) 65 and an accumulator 54 as a further alternative. The read-only memory 65 is supplied with the inphase and the quadrature phase component signals I and Q produced by the quadrature demodulator 37 in response to the received signal. The read-only memory 65 is additionally supplied with the accumulated phase error signal from the accumulator 54 which in turn is supplied the phase error signal from the frequency difference determining circuit 37 through the phase error signal lead 47. Using the inphase and the quadrature phase component signals I and Q and the accumulated phase error signal correctively as an address or access signal, the read-only memory 65 produces the above-mentioned correct inphase and quadrature phase component signals Î and Q̂. When each of the inphase and the quadrature phase component signals I and Q and the correct inphase and quadrature phase component signals Î and Q̂ is represented by M bits to represent each phase value and when the accumulated phase error signal is represented by a like number of bits in representing each phase error $kE\phi$, where M represents a predetermined integer, the read-only memory 65 should have a memory capacity of $2^{3M} \times M \times 2$ bits.

Reviewing FIGS. 3 through 7, the phase error signal may be used to stop operation of the phase correcting circuit 39 until it begins to represent the phase error $E\phi$. In any event, the phase correcting circuit 39 is supplied with the phase error signal representative of the phase error $E\phi$ and the aforementioned second vector signal to correct the second phase $\phi(kT)$ by the phase error $E\phi$ into a second correct phase $\hat{\phi}(kT)$ variable in compliance with the data and the carrier frequency to produce the correct inphase and quadrature phase component signals Î and Q̂ collectively as a corrected vector signal which has the correct phase. It is possible to use a digital signal processor in place of the frequency difference determining and the phase correcting circuits 38 and 39 exemplified above. It is moreover possible to use a memory for temporarily remorizing the phase values for subsequent processing in the manner which will later be described. This is useful particularly when the symbols are represented by bursts as in the time division multiple access communication.

In FIGS. 3 through 7, the phase error $E\phi$ represents the frequency difference w between the received and local carrier signals. It is therefore possible to feed the phase error signal back to the carrier generator 36 through a connection indicated by a dashed line 47' in correcting the local carrier frequency.

In connection with FIG. 4, the orthogonal to polar coordinate converter 41 will now be taken into consideration. When implemented by a read-only memory, the converter 41 is not very compact. Its power consumption is not negligible. It is therefore desirable to avoid use of a read-only memory in obtaining the phase values $\phi(kT)$ from the inphase and the quadrature phase components, which will now be denoted by I(t) and Q(t).

Figure 8:
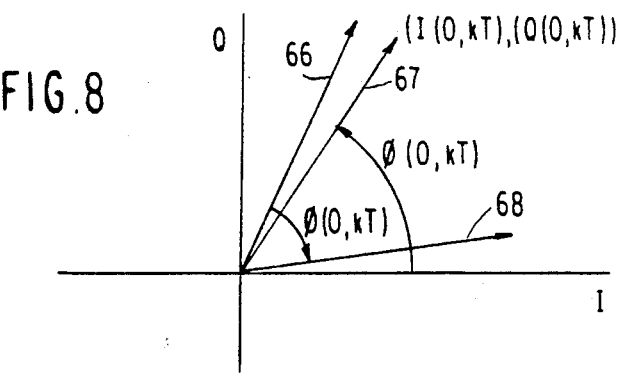
FIG. 8, drawn below

Referring now to FIG. 8, an actual signal vector 66 is depicted on a phase plane which is similar to that illustrated with reference to FIG. 1. The actual signal vector 66 is derived by sampling the inphase and the quadrature phase components I(t) and Q(t) by a sampling clock signal of a sampling interval which is substantially equal to the predetermined symbol interval T. Consequently, the actual signal vector 66 is represented by actual inphase and qudrature phase component samples I(A, kT) and A(A, kT) and has an acutal absolute value r(kT) and an actual phase value $\phi$(A, kT). Such actual phase values are variable substantially at the symbol interval T and will be called phase values of the first phase when the actual signal vector 66 is derived from the particular signal sequence as the first signal vector. It is possible to understand that each phase value of the first phase $\phi$(A, kT) is represented by the actual inphase and quadrature phase component samples I(A, kT) and Q(A, kT).

If subjected to quadrature demodulation by an ideal local carrier signal a frequency equal to having the received carrier frequency, the particular signal sequence would become ideal inphase and quadrature phase component signals. An ideal or zeroth signal vector 67 is thereby defined to have ideal inphase and quadrature phase component samples I(O, kT) and Q(O, kT), an ideal absolute value R(kT), and an ideal phase value $\phi$(O, kT). Such ideal phase values are defined in correspondence to the respective phase values of the first phase and will alternatively be called reference values. Inasmuch as the predetermined manner and the received carrier frequency are preliminarily known, it is possible to determined each reference value $\phi$(O, kT) and to represent the reference value by the ideal inphase and quadrature phase component samples I(O, kT) and Q(I, kT).

If given a backward or negative rotation of the reference value $\phi$(O, kT), the ideal signal vector 67 rests on the positive part of the inphase axis I. Let the actual signal vector 66 be given the negative rotation. The actual signal vector 66 becomes a rotated signal vector 68 which has rotated inphase and quadrature component samples I(R, kT) and Q(R, kT), the actual absolute value R(kT), and a rotated phase value $\phi$(R, kT). Such rotated phase values correspond to the respective phase values of the first phase and will alternatively be referred to simply as rotated values. Represented by the rotated inphase and quadrature phase component samples I(R, kT) and Q(R, kT), each rotated value $\phi$(R, kT) is equal to the phase value of the first phase $\phi$(A, kT) minus the reference value $\phi$(O, kT) and is calculated in accordance with:

$$\begin{pmatrix} I(R, kT) \\ Q(R, kT) \end{pmatrix} = \begin{pmatrix} I(O, kT) & Q(O, kT) \\ -Q(O, kT) & I(O, kT) \end{pmatrix} \begin{pmatrix} I(A, kT) \\ Q(A, kT) \end{pmatrix} / R(kT). \quad (1)$$

If the ideal local carrier signal were used, the actual and the ideal signal vectors 66 and 67 would have a common phase variation. The rotated value would therefore be kept constant. In practice, the local carrier frequency may not necessarily be equal to the received carrier frequency. Two consecutive ones of the rotated values $\phi(R, kT)$ and $\phi(R, (k-1)T)$ therefore have a phase difference or phase variation $\Delta\phi(R, k)$ which depends on the predetermined manner and the carrier frequency difference. On the other hand, two consecutive ones of the reference values $\phi(R, kT)$ and $\phi(O, (k-1)T)$ have a reference variation $\Delta\phi(O, k)$ which is determined by the predetermined manner and the received carrier frequency, both preliminarily known.

A difference between the phase difference or the phase variation and the reference variation is calculated to provide an individual error $E\phi(k)$. Inasmuch as the rotated or the actual absolute value at a symbol count k is approximately equal to the rotated or the actual absolute value at the symbol count less one (k−1) and inasmuch as the individual error would be small so that the sine of the individual error is approximately equal to the individual error, the individual error is calculated according to:

$$E\phi(k) = [I(R, ((k-1)T)Q(R, kT) - \qquad (2)$$
$$I(R, kT)Q(R, ((k-1)T)]/[I^2(R, kT) + Q^2(R, kT)].$$

Figure 9:
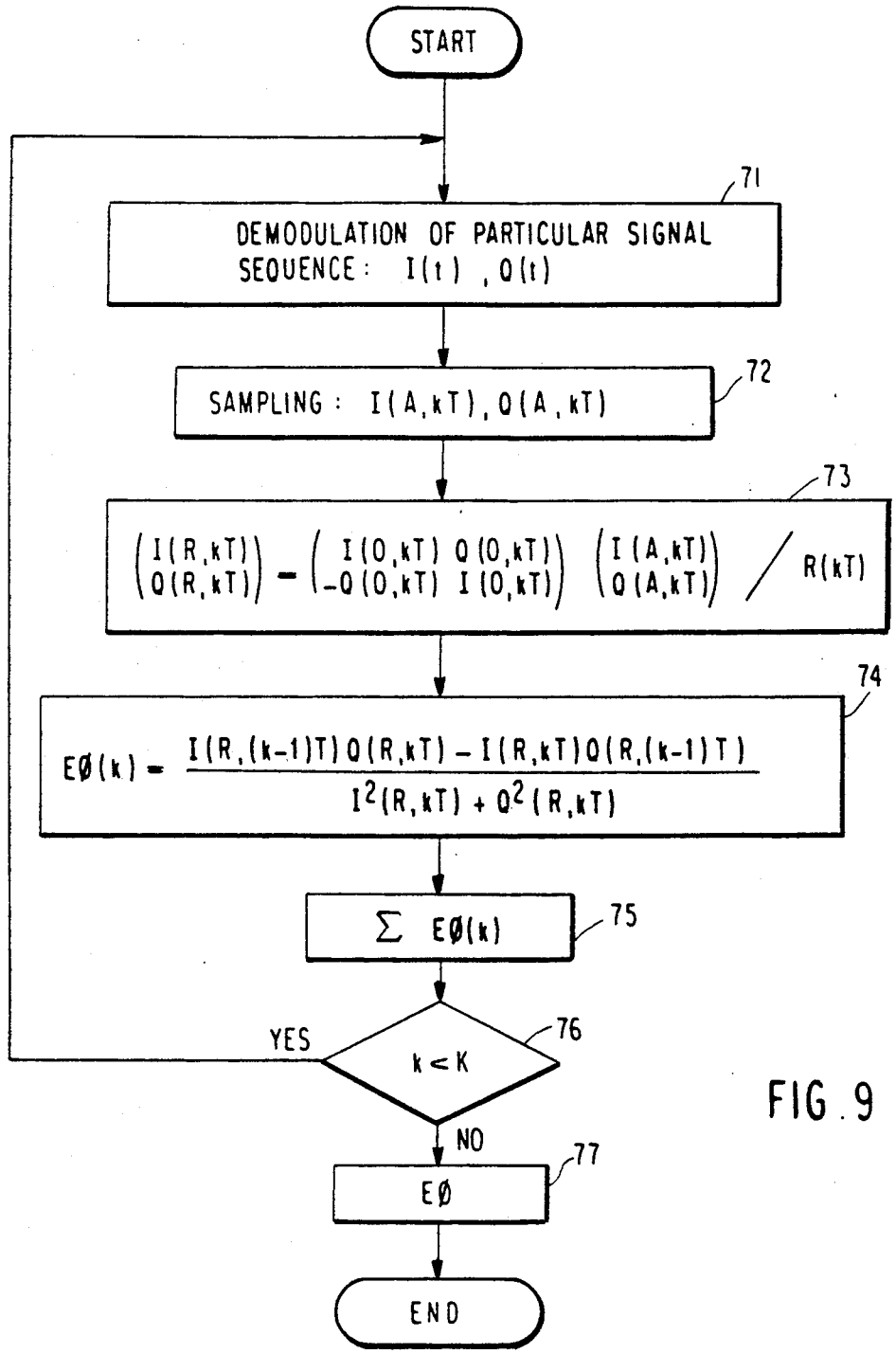
FIG. 9 shows a partial flow chart for use in describing a quadrature demodulating method according to a third embodiment of this invention.

Referring to FIG. 9, the description will proceed to a quadrature demodulating method according to a third embodiment of this invention. The method being described, is a modification of the method illustrated with reference to FIG. 2.

At a first step 71 which corresponds to the first primary step 21 described in conjunction with FIG. 2, the particular signal sequence is quadrature demodulated into the first vector signal representative of the first signal vector having the inphase and the quadrature phase components I(t) and Q(t). At a second step 72, the inphase and the quadrature phase components are sampled into the phase values of the first phase, namely, into the actual inphase and quadrature phase component samples I(A, kT) and Q(A, kT), substantially at the symbol interval T.

At a third step 73, the phase value of the first phase is given the backward rotation. The rotated value $\phi(R, kT)$ is given by a combination of the rotated inphase and quadrature phase component samples I(R, kT) and Q(R, kT) which are calculated in accordance with Equation (1).

At a fourth step 74, the individual error $E\phi(k)$ is calculated according to Equation (2). At a fifth step 75, such individual errors are summed up into a summation. At a sixth step 76, the symbol count k is checked against a total count K which is determined so as not to be greater than the predetermined number determined by the predetermined manner. Determination of the total count K is described in the prior patent application and will not be described in detail herein.

If the symbol count k is less than the total count K, the sixth step 76 returns to the first step 71. When the symbol count reaches the total count in the sixth step 76, the summation is divided at a seventh step 77 by the total count K to provide a phase error $E\phi$ between the first phase and a first correct phase which the first signal vector would have when the carrier frequency difference were equal to zero.

On quadrature demodulating the data signal sequence, the seventh step 77 proceeds to the secondary steps described in connection with FIG. 2. When the frequency difference w should be calculated, the summation is divided by a product of $2\pi T$ and the total count K rather than by the total count K aone. It is possible to deal with the first through the seventh steps 71 to 77 by a digital signal processor. The secondary steps can also be dealt with by the digital signal processor.

Reviewing FIG. 9, it is understood that a combination of the first and the sixth steps 71 and 76 serves as a quadrature demodulating step of demodulating the angular modulated or the received signal into the first and the second signal vectors. Another combination of the second through the seventh steps 72 to 77 serves as a computing step of computing the phase error $E\phi$ between a phase variation $\Delta\phi(R, k)$ in the first phase and a reference variation $\Delta\phi(O, k)$ determined by the predetermined manner and the received carrier frequency.

More particularly, the second and the sixth steps 72 and 76 collectively serve as a phase value calculating step of calculating the phase values of the first phase I(A, kT) and Q(A, kT). The third and the sixth steps 73 and 76 collectively serve as a rotated value calculating step of calculating the rotated values I(R, kT) and Q(R, kT) by using each of the phase values of the first phase and the reference value I(O, kT) and Q(O, kT). The fourth through the sixth steps 74 to 76 collectively serve as an individual error calculating step of calculating the individual error $E\phi(k)$ by calculating the phase difference $\Delta\phi(R, k)$. The seventh step 77 serves as a phase error calculating step of calcuIzting the phase error $E\phi$.

Figure 10:
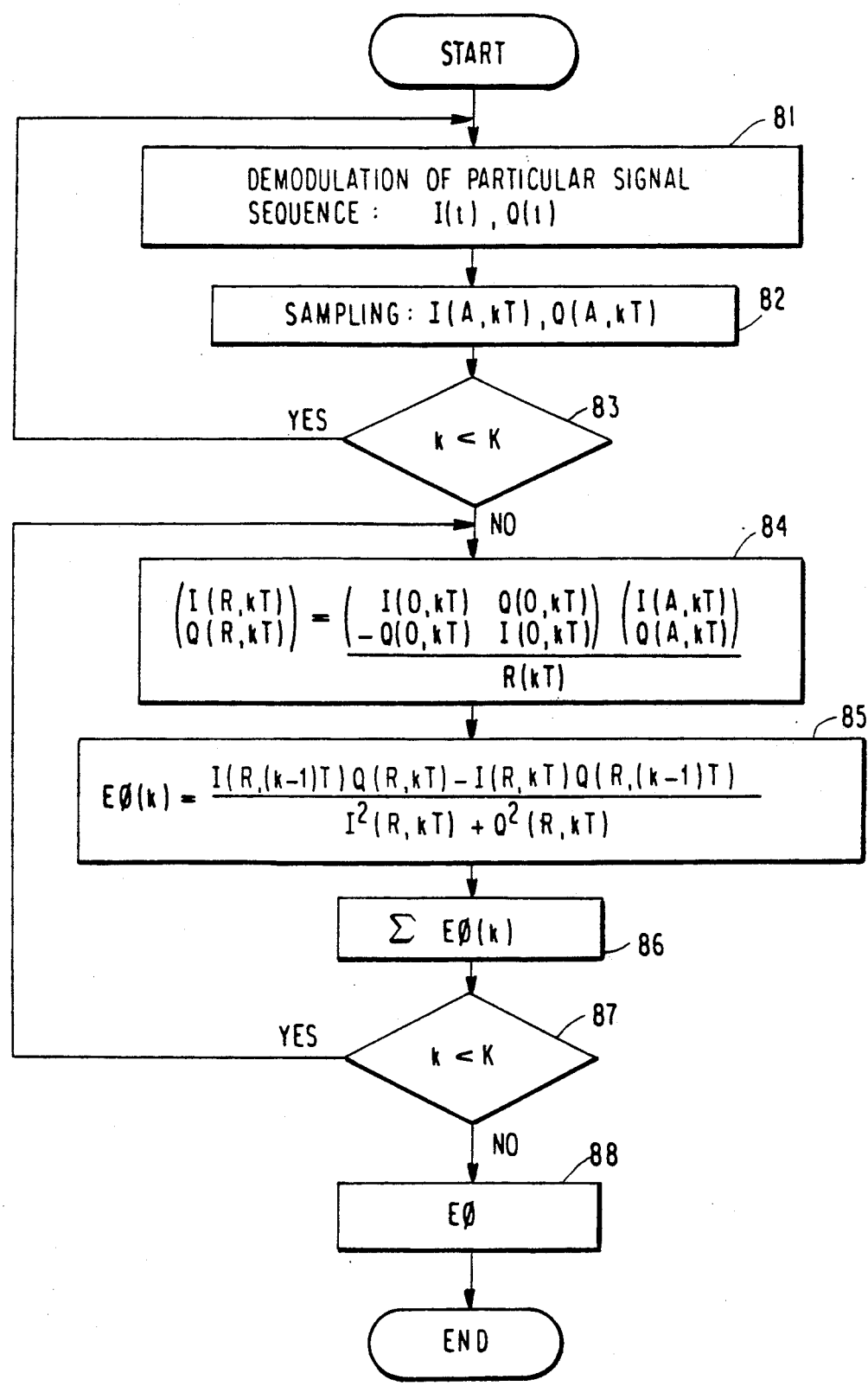
FIG. 10 shows a partial flow chart for use in describing a quadrature demodulating method according to a fourth embodiment of this invention.

Referring to FIG. 10, the description will proceed finally to a quadratue demodulating method according to a fourth embodiment of this invention. The method being described, is another modification of the method illustrated with reference to FIG. 2 and makes use of a memory which is described reviewing FIGS. 3 through 7 and may be understood as represented by the block 38 in FIG. 3.

At a first step 81, the particular signal sequence is quadrature modulated into the first signal vector represented by the inphase and the quadrature phase components I(t) and Q(t). At a second step 82, the inphase and the quadrature phase components are sampled into the phase values of the first phase in the manner depicted by I(A, kT) and Q(A, kT). The phase values are stored in the memory as memorized values. At a third step 83, the symbol count k is checked against the total count K.

If the symbol count k is less than the total count K, the third step 83 returns to the first step 81. When the symbol count becomes equal to the total count, the phase values of the first phase are memorized substantially throughout the particular signal sequence. The third step 83 proceeds to other steps which will be described below.

At a fourth step 84, each memorized value is used in calculating the rotated value $\phi(R, kT)$ in accordance with Equation (1). As before, the rotated value is depicted by the rotated inphase and quadrature phase component samples I(R, kT) and Q(R, kT). Such rotated values are buffered in the memory.

At a fifth step 85, two consecutive ones of the rotated values $\phi(R, kT)$ and $\phi(R, (k-1)T)$ are used in calculating the individual error $E\phi(k)$ according to Equation (2). At a sixth step 86, the individual eerors are summed up into the summation. At a seventh step 87, the symbol count k is again checked against the total count K.

If the symbol count k is less than the total count K, the seventh step 87 returns to the fourth step 84. When the symbol count reaches the total count, the phase error $E\phi$ is calculated at an eighth step 88.

On quadrature demodulating the data signal sequence, the eighth step 88 proceeds to the secondary steps described in conjunction with FIG. 2. The frequency difference w can be calculated like in FIG. 9. It is possible to use a digital signal processor in dealing with the first through the eighth steps 81 to 88 and furthermore in processing the secondary steps.

In FIGS. 3 through 7, the phase error E$\phi$ represents the frequency difference w between the received and local carrier signals. It is therefore possible to feed the phase error signal back to the carrier generator 36 through a connection indicated by a dashed line 47' in correcting the local carrier frequency. This feedback operation will now be described referring to FIGS. 11 to 14.

In FIG. 11, steps 131 to 134 correspond to the secondary steps 31 to 34 in FIG. 2 and correct the local carrier frequency to the received carrier frequency. At step 131, the phase error signal E$\phi$ is supplied from the frequency difference determining circuit 38 to a local carrier generator 36a (see FIG. 12). Referring temporarily to FIG. 12, a quadrature demodulating device comprises a orthogonal demodulator (detector) 37, the frequency difference determining circuit 38 and the local carrier generator 36a. Since the carrier frequency difference is corrected at the local carrier generator 36a, the demodulating device need not have the phase correcting circuit in the FIG. 3 circuit.

Returning to FIG. 11, at step 132, the local carrier frequency generated from the generator 36a is corrected to be equal to the received carrier frequency. Thereafter, a data sequence is received at step 133 and this operation continues untail the data length reaches the count N' (see step 134).

In FIG. 13, the local carrier generator 36a is composed of a voltage-controlled oscillator (VCO) 361, a digital-to-analog (D/A) converter 362 and an accumulator 363. The accumulator 363 accumulates the phase error E$\phi$ which is an averaged phase error per symbol and calculated at the frequency difference determining circuit 38. The accumulated phase error is converted into an analog value by the D/A converter 362. In response to the converted analog value, the VCO 361 changes its oscillation frequency, i.e., the local carrier frequency, so that the frequency difference between the received and local carrier frequencies approaches to zero.

More specifically, since the VCO 631 has a control voltage vs. oscillation frequency characteristic shown in FIG. 14, if the local carrier frequency is higher than the received one, a lower control voltage is applied to the VCO 631 and vice versa. To avoid the divergent at VCO 631 and to shorten the VCO's convergent time, the accumulator 363 performs the following weighting operation, thereby to supply its output S(k) to the D/A converter 362.

$$S(k) = W_1 \left( \sum_{i}^{k-1} E\phi(i) + W_2 \cdot E\phi(k) \right)$$

where $W_1$ and $W_2$ are weighting factors.

It is to be noted that the above-mentioned accumulator 363 may be implemented by a digital signal processor.

While this invention has thus far been described in specific conjunction with a few preferred embodiments thereof, it will now be readily possible for one skilled in the art to carry this invention into effect in various other manners. For example, it is possible to carry out the method illustrated with reference to FIG. 2 by using the memory like the method described in connection with FIG. 10 and by using the total count K described in conjunction with FIGS. 9 and 10. The particular symbol sequence is not restricted to those exemplified above. If desired, it is readily possible to stop supply of the inphase and the quadrature phase component signals from the quadrature demodulator 37 to the frequency difference determining circuit 38 as soon as the phase error signal is produced. The memory can be used in memorizing successively the phase values of the first and the second signal vectors and in buffering, when the method is carried out in accordance with FIGS. 9 or 10, the rotated values. As soon as the phase error E$\phi$ is calculated at the seventh primary step 27, the fifth step 75, or the sixth step 86, it is possible to begin the third secondary step 33 described in conjunction with FIG. 2.

What is claimed is:

1. A method of quadrature demodulating an angular modulated signal derived by angular modulation of a first carrier signal of a first carrier frequency by a modulating signal comprising symbols representative of binary one and zero, a particular symbol sequence comprising the symbols in a predetermined manner, and a data symbol sequence comprising the symbols to represent data, said method comprising the steps of:

generating a second carrier signal of a second carrier frequency having a frequency difference relative to said first carrier frequency;

quadrature demodulating said angular modulated signal by said second carrier signal into a first signal vector having a first phase variable in compliance with said predetermined manner and said frequency difference and into a second signal vector having a second phase variable in compliance with said data and said frequency difference;

determining, by comparison of a phase variation in said first phase with a reference variation determined by said predetermined manner, a phase error between said first phase and a first correct phase which said first signal vector has when said frequency difference is equal to zero; and correcting said second phase by said phase error into a second correct phase which said second signal vector has when said frequency difference is equal to zero.

2. A method as claimed in claim 1, wherein said determining step comprises the steps of:

converting said first phase to phase values substantially at a predetermined symbol interval determined by said predetermined manner;

calculating a phase difference between two consecutive ones of said phase values as said phase variation in each symbol interval;

calculating an individual error between said phase difference and said reference variation to provide successively calculated individual errors; and calculating said phase error by dividing a summation of said successively calculated individual errors by a total count determined by said predetermined manner when said successively calculated individual errors reach in number to said total count.

3. A device for quadrature demodulating an angular modulated signal derived by angular modulation of a first carrier signal of a first carrier frequency by a modulating signal comprising symbols representative of binary one and zero, a particular symbol sequence comprising the symbols in a predetermined manner, and a data symbol sequence comprising the symbols to represent data, said device comprising:
- a carrier generator for generating a second carrier signal of a second carrier frequency having a frequency difference relative to said first carrier frequency;
- a quadrature demodulator for demodulating said angular modulated signal by said second carrier signal into a first signal vector having a first phase variable in compliance with said predetermined manner and said frequency difference and into a second signal vector having a second phase variable in compliance with said data and said frequency difference to produce first and second vector signals representative of said first and said second signal vectors;
- a frequency difference determining circuit supplied with said first vector signal for determining a phase error between said first phase and a first correct phase variable in compliance with said predetermined manner and said first carrier frequency by comparison of a phase variation in said first phase with a reference variation determined by said predetermined manner to produce a phase error signal representative of said phase error; and
- a phase correcting circuit supplied with said second vector signal and said phase error signal for correcting said second phase by said phase error into a second correct phase variable in compliance with said data and said first carrier frequency to produce a corrected vector signal having said second correct phase.

4. A device as claimed in claim 3, said first vector signal representing inphase and quadrature phase amplitude values, wherein said frequency difference determining circuit comprises:
- an orthogonal to polar coordinate converter supplied with said first vector signal for converting said inphase and said quadrature phase amplitude values to phase values substantially at a predetermined symbol interval determined by said predetermined manner to produce a phase value signal representative of said phase values;
- a phase difference calculating circuit supplied with said phase value signal for calculating a phase difference as said phase variation between two consecutive ones of said phase values to produce a difference signal representative of said phase difference;
- a subtracter supplied with said difference signal for calculating an individual error between said phase difference and said reference variation to produce an individual error signal representative of successively calculated individual errors; and
- a phase error calculating circuit supplied with said individual error signal for calculating said phase error to produce said phase error signal by dividing a summation of said successively calculated individual errors by a total count determined by said prdetermined manner when said successively calculated individual errors reach in number to said total count.

5. A method of quadrature demodulating an angular modulated signal derived by angular modulation of a first carrier signal of a first carrier frequency by a modulating signal comprising symbols representative of binary one and zero, a particular symbol sequence comprising the symbols in a predetermined manner, and a data symbol sequence comprising the symbols to represent data, said method comprising the steps of:
- generating a second carrier signal of a second carrier frequency having a frequency difference relative to said first carrier frequency;
- quadrature demodulating said angular modulated signal by said second carrier signal into a first signal vector having a first phase variable in compliance with said predetermined manner and said frequency difference and into a second signal vector having a second phase variable in compliance with said data and said frequency difference;
- computing a phase error between a phase variation in said first phase and a reference variation determined by said predetermined manner and said first carrier frequency; and
- correcting said second phase by said phase error into a correct phase which said second signal vector has when said frequency difference is equal to zero.

6. A method as claimed in claim 5, wherein said computing step comprises the steps of:
- calculating phase values of said first phase substantially at a predetermined symbol interval determined by said predetermined manner;
- calculating, by using each of said phase values, a rotated value which is equal to said each of the phase values minus a reference value determined by said predetermined manner and said first carrier frequency, thereby to provide successively calculated rotated values;
- calculating an individual error between said reference value and a phase difference calculated between two consecutive ones of said successively calculated rotated values as said phase variation, thereby to provide successively calculated individual errors; and
- calculating said phase error by dividing a summation of said successively calculated individual errors by a total count determined by said predetermined manner when said successively calculated individual errors reach in manner to said total count.

* * * * *

UNITED STATES PATENT AND TRADEMARK OFFICE
CERTIFICATE OF CORRECTION

PATENT NO. : 5,079,512

DATED : January 7, 1992

INVENTOR(S) : Hiroyasu Muto

It is certified that error appears in the above-indentified patent and that said Letters Patent is hereby corrected as shown below:

Col. 8, line 8, delete in its entirety and insert therefor --step 27, into a second correct phase $\hat{\phi}(kT)$ which each--.

Col. 10, line 16, delete in its entirety and insert therefor --phase value $\hat{\phi}(kT)$ to produce a correct phase signal $\hat{A}$--;

Col. 10, line 26, delete "Q" and insert --$\hat{Q}$--;

Col. 10, line 42, delete in its entirety and insert therefor --has a correct phase $\hat{\phi}(kT)$ which is equal to the phase--.

Col. 11, line 10, delete "Q" and insert --$\hat{Q}$--;

Col. 11, line 28, delete "Q" and insert --$\hat{Q}$--;

Col. 11, line 44, delete in its entirety and insert therefor --E$\phi$ into a second correct phase $\hat{\phi}(kT)$ variable in com- --.

UNITED STATES PATENT AND TRADEMARK OFFICE
CERTIFICATE OF CORRECTION

PATENT NO. : 5,079,512
DATED : January 7, 1992
INVENTOR(S) : Hiroyasu Muto

It is certified that error appears in the above-indentified patent and that said Letters Patent is hereby corrected as shown below:

Col. 12, line 12, delete "acutal" and insert --actual--.

Signed and Sealed this

Fourteenth Day of December, 1993

Attest:

BRUCE LEHMAN

*Attesting Officer*    *Commissioner of Patents and Trademarks*